(12) United States Patent
Murata

(10) Patent No.: US 7,312,804 B2
(45) Date of Patent: Dec. 25, 2007

(54) PROGRAM PRODUCT, IMAGE GENERATION METHOD AND IMAGE GENERATION SYSTEM

(75) Inventor: Shigeto Murata, Miruka (JP)

(73) Assignee: Namco Bandai Games Inc., Tokyo (JP)

( * ) Notice: Subject to any disclaimer, the term of this patent is extended or adjusted under 35 U.S.C. 154(b) by 3 days.

(21) Appl. No.: 11/117,544

(22) Filed: Apr. 29, 2005

(65) Prior Publication Data
US 2005/0270309 A1     Dec. 8, 2005

(30) Foreign Application Priority Data
May 7, 2004     (JP)     ............... 2004-138919

(51) Int. Cl.
*G09G 5/00* (2006.01)
(52) U.S. Cl. ........................... 345/632; 345/427
(58) Field of Classification Search ............... None
See application file for complete search history.

(56) References Cited
U.S. PATENT DOCUMENTS 6,377,277 B1 * 4/2002 Yamamoto ............... 345/629
6,409,604 B1 * 6/2002 Matsuno ..................... 463/43
6,980,207 B2 * 12/2005 Yamamoto et al. ......... 345/419
2003/0193496 A1 * 10/2003 Wada ........................ 345/419
2004/0157662 A1 * 8/2004 Tsuchiya ..................... 463/32
2006/0028393 A1 * 2/2006 Love et al. .................. 345/1.1

FOREIGN PATENT DOCUMENTS

JP     A 10-179932     * 7/1998

* cited by examiner

*Primary Examiner*—Marik Zimmerman
*Assistant Examiner*—David Chu
(74) *Attorney, Agent, or Firm*—Oliff & Berridge, PLC

(57) ABSTRACT

When the occurrence of an effect event in which an effect object is generated is determined, it is determined whether or not a virtual camera exists within an effect range set based on an occurrence position of the effect event. When the existence of the virtual camera within the effect range is determined, at least the effect object positioned outside a field of view of the virtual camera is moved and positioned within the field of view of the virtual camera.

18 Claims, 11 Drawing Sheets

PROGRAM PRODUCT, IMAGE GENERATION METHOD AND IMAGE GENERATION SYSTEM

Japanese Patent Application No. 2004-138919, filed on May 7, 2004, is hereby incorporated by reference in its entirety.

BACKGROUND OF THE INVENTION

The present invention relates to a program product, an image generation system, and an image generation method.

An image generation system (game system) which generates an image viewed from a virtual camera (given viewpoint) in an object space (virtual three-dimensional space) in which an object such as a character is positioned has been known. Such an image generation system is very popular as a system which enables experience of so-called virtual reality. In an image generation system which generates a game image for an action game in which a player causes a character to move in the object space or to show action by operating the character, a three-dimensional image is generated in which game production such as explosion, flame, or smoke is represented using an effect object when an event has occurred. A method of using an object which two-dimensionally represents an effect, such as a sprite polygon (billboard polygon), has been proposed for a system which generates such a three-dimensional image in order to simplify the processing (Japanese Patent Application No. 10-179932).

According to this method, if the effect object is positioned behind the virtual camera when an event (effect event) which causes the effect object to be generated has occurred near the player's character, a situation may occur in which the player cannot recognize the image effect to be seen. Even if the effect object is positioned in front of the virtual camera, a similar situation may also occur when the effect object is positioned between the virtual camera and the screen. In particular, when the effect object is provided with the effect of applying hit damage to the character operated by the player, an inconsistent situation may occur in which the player's character is damaged even though the player cannot recognize the image effect.

SUMMARY

According to a first aspect of the invention, there is provided a program product for generating an image, the program product causing a computer to function as:

an event occurrence determination section which determines whether or not an effect event has occurred, an effect object being generated in the effect event;

a position determination section which determines whether or not a virtual camera or a player's character operated by a player exists within a given effect range, when the event occurrence determination section determines that the effect event has occurred, the effect range being set based on an occurrence position of the effect event;

an effect position processing section which positions at least the effect object positioned outside a field of view of the virtual camera or a dummy effect object provided in advance within the field of view of the virtual camera, when the event occurrence determination section determines that the virtual camera or the player's character exists within the effect range; and an image generation section which generates an image viewed from the virtual camera in an object space.

According to a second aspect of the invention, there is provided a program product for generating an image, the program product causing a computer to function as:

an event occurrence determination section which determines whether or not an effect event has occurred, an effect object being generated in the effect event;

a position determination section which determines whether or not a virtual camera or a player's character operated by a player exists within a given effect range, when the event occurrence determination section determines that the effect event has occurred, the effect range being set based on an occurrence position of the effect event;

a virtual camera control section which changes a position of the virtual camera so that at least the effect object positioned outside a field of view of the virtual camera becomes to be within the field of view of the virtual camera, when the event occurrence determination section determines that the virtual camera or the player's character exists within the effect range; and an image generation section which generates an image viewed from the virtual camera in an object space.

According to a third aspect of the invention, there is provided an image generation system for generating an image, the image generation system comprising:

an event occurrence determination section which determines whether or not an effect event has occurred, an effect object being generated in the effect event;

a position determination section which determines whether or not a virtual camera or a player's character operated by a player exists within a given effect range, when the event occurrence determination section determines that the effect event has occurred, the effect range being set based on an occurrence position of the effect event;

an effect position processing section which positions at least the effect object positioned outside a field of view of the virtual camera or a dummy effect object provided in advance within the field of view of the virtual camera, when the event occurrence determination section determines that the virtual camera or the player's character exists within the effect range; and an image generation section which generates an image viewed from the virtual camera in an object space.

According to a fourth aspect of the invention, there is provided an image generation system for generating an image, the image generation system comprising:

an event occurrence determination section which determines whether or not an effect event has occurred, an effect object being generated in the effect event;

a position determination section which determines whether or not a virtual camera or a player's character operated by a player exists within a given effect range, when the event occurrence determination section determines that the effect event has occurred, the effect range being set based on an occurrence position of the effect event;

a virtual camera control section which changes a position of the virtual camera so that at least the effect object positioned outside a field of view of the virtual camera becomes to be within the field of view of the virtual camera, when the event occurrence determination section determines that the virtual camera or the player's character exists within the effect range; and an image generation section which generates an image viewed from the virtual camera in an object space.

According to a fifth aspect of the invention, there is provided an image generation method, comprising:

determining whether or not an effect event has occurred, an effect object being generated in the effect event;

determining whether or not a virtual camera or a player's character operated by a player exists within a given effect range, when the occurrence of the effect event is determined, the effect range being set based on an occurrence position of the effect event;

positioning at least the effect object positioned outside a field of view of the virtual camera or a dummy effect object provided in advance within the field of view of the virtual camera, when the existence of the virtual camera or the player's character within the effect range is determined; and generating an image viewed from the virtual camera in an object space.

According to a sixth aspect of the invention, there is provided an image generation method, comprising:

determining whether or not an effect event has occurred, an effect object being generated in the effect event;

determining whether or not a virtual camera or a player's character operated by a player exists within a given effect range, when the occurrence of the effect event is determined, the effect range being set based on an occurrence position of the effect event;

changing a position of the virtual camera so that at least the effect object positioned outside a field of view of the virtual camera becomes to be within the field of view of the virtual camera, when the existence of the virtual camera or the player's character within the effect range is determined; and generating an image viewed from the virtual camera in an object space.

DETAILED DESCRIPTION OF THE EMBODIMENT

Figure 1:
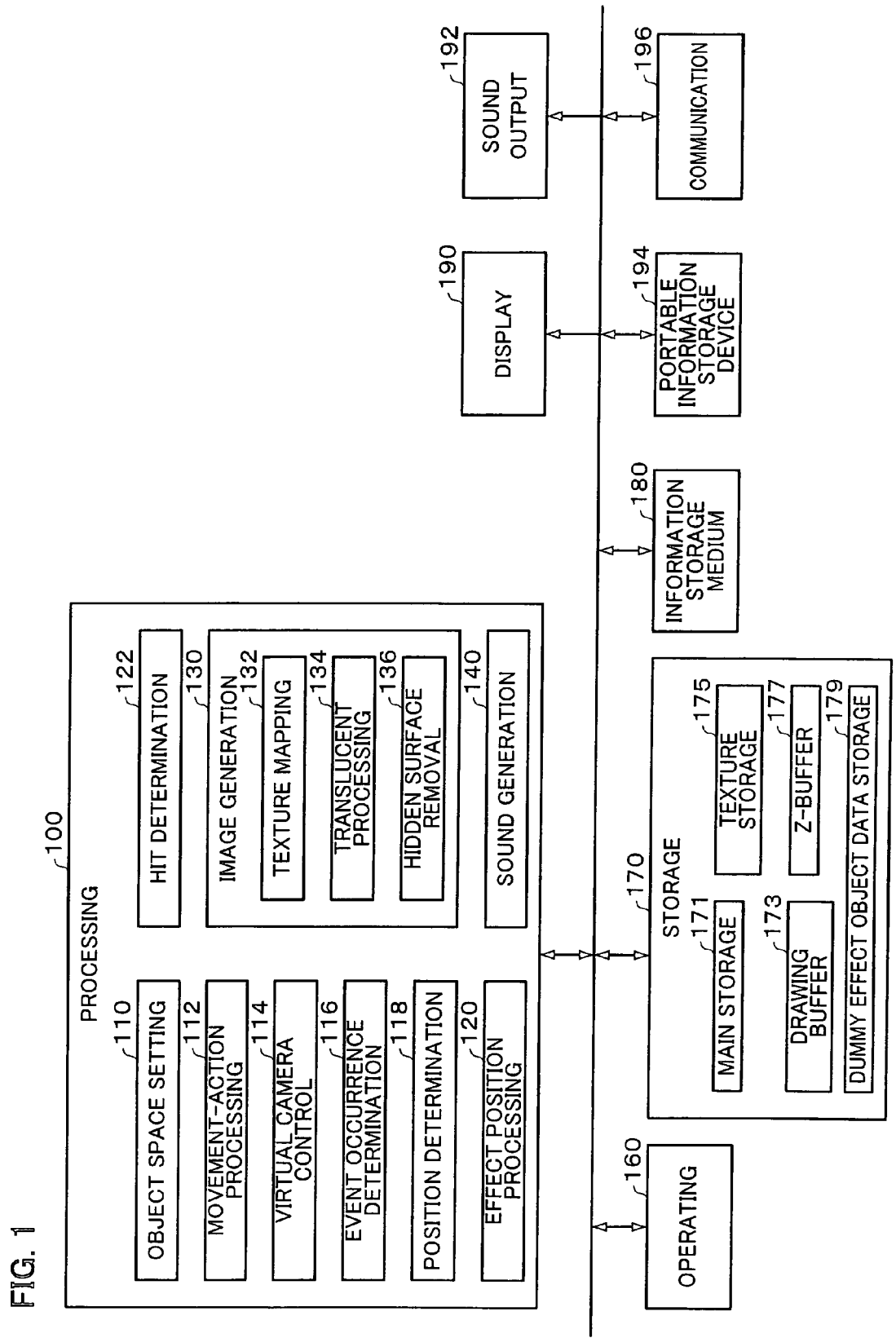
FIG. 1 is a functional block diagram showing an image generation system according to one embodiment of the invention.

The invention may provide a program product, an image generation system, and an image generation method which allow a player to reliably recognize occurrence of an effect event.

According to one embodiment of the invention, there is provided an image generation system for generating an image, the image generation system comprising:

an event occurrence determination section which determines whether or not an effect event has occurred, an effect object being generated in the effect event;

a position determination section which determines whether or not a virtual camera or a player's character operated by a player exists within a given effect range, when the event occurrence determination section determines that the effect event has occurred, the effect range being set based on an occurrence position of the effect event;

an effect position processing section which positions at least the effect object positioned outside a field of view of the virtual camera or a dummy effect object provided in advance within the field of view of the virtual camera, when the event occurrence determination section determines that the virtual camera or the player's character exists within the effect range; and an image generation section which generates an image viewed from the virtual camera in an object space.

According to one embodiment of the invention, there is provided a program product causing a computer to function as the above-described sections.

In the above embodiment, an image in which the effect object is represented so that the player reliably recognizes that the effect event has occurred near the virtual camera or the player's character operated by the player can be generated by changing the position of the effect object positioned outside the field of view of the virtual camera (given viewpoint) within the field of view of the virtual camera or positioning the dummy effect object provided in advance within the field of view of the virtual camera when the effect event has occurred.

In each of the image generation system, the program product and the image generation method according to the above embodiment, when a plurality of the effect objects are generated based on the effect event, the effect position processing section may move and position the effect objects within the field of view of the virtual camera without changing at least a positioning order of the effect objects in a depth direction in a camera coordinate system.

This prevents the generated image from becoming inconsistent due to the positioning disorder of each object caused by a change in position of the effect objects.

In each of the image generation system, the program product and the image generation method according to the above embodiment, a space between a first boundary surface set in front of the virtual camera in the camera coordinate system and a second boundary surface set behind the virtual camera in the camera coordinate system may be set as a given depth range; and the effect position processing section may calculate depth information on the effect objects in the camera coordinate system based on a ratio of a first distance between the first boundary surface and a screen to a second distance between the first boundary surface and the second boundary surface so that the effect objects are positioned between the first boundary surface and the screen, and may move and position the effect objects within the field of view of the virtual camera based on the depth information, the effect objects having been positioned within the depth range.

This allows the positions of only the effect objects positioned within a given area defined by the first boundary surface and the second boundary surface to be changed, whereby the generated image rarely becomes inconsistent, and an increase in the processing load can be prevented. Moreover, since the depth information on the effect object after changing the position is calculated based on the distance ratio determined based on the relationship with predetermined boundary surfaces when the position of each effect object is changed, the positioning order and the positioning interval ratio of the effect objects are not changed, whereby more consistent effect representation can be realized.

In each of the image generation system, the program product and the image generation method according to the above embodiment, when a plurality of the effect objects are generated based on the effect event, the effect position processing section may position a plurality of dummy effect objects respectively corresponding to the effect objects within the field of view of the virtual camera, according to at least a positioning order of the effect objects in a depth direction in a camera coordinate system.

Since the dummy effect objects corresponding to the effect objects are positioned according to the positioning order of each effect object, the generated image can be prevented from becoming inconsistent.

In each of the image generation system, the program product and the image generation method according to the above embodiment, a space between a first boundary surface set in front of the virtual camera in the camera coordinate system and a second boundary surface set behind the virtual camera in the camera coordinate system may be set as a given depth range; and the effect position processing section may calculate depth information on the effect objects in the camera coordinate system when the effect objects are positioned between the first boundary surface and a screen, based on a ratio of a first distance between the first boundary surface and the screen to a second distance between the first boundary surface and the second boundary surface, and may position a plurality of dummy effect objects respectively corresponding to the effect objects within the field of view of the virtual camera based on the depth information, the effect objects having been positioned within the depth range.

Since it suffices to generate the dummy effect objects corresponding to at least the effect objects positioned within a given area defined by the first boundary surface and the second boundary surface, an increase in the processing load can be prevented. Moreover, since the depth information which decides the position of the dummy effect object positioned within the field of view of the virtual camera is calculated based on the distance ratio determined based on the relationship with predetermined boundary surfaces, the positioning order and the positioning interval ratio of the dummy effect objects are not changed from the positioning order and the positioning interval ratio of the effect objects, whereby more consistent effect representation can be implemented.

In each of the image generation system, the program product and the image generation method according to the above embodiment, the program product may cause the computer to function as:

a translucent processing section which performs translucent blending processing based on depth information in a camera coordinate system on the effect object or the dummy effect object positioned by the effect position processing section so that transparency of the effect object or the dummy effect object is increased as a position of the effect object or the dummy effect object comes closer to a position of a screen or the virtual camera.

This prevents the player's character operated by the player from becoming difficult to see. Moreover, the effect can be prevented from being represented to inconsistently disappear even if the virtual camera is moved together with the player's character (when the virtual camera is controlled to follow the movement or motion of the player's character).

In each of the image generation system, the program product and the image generation method according to the above embodiment, a screen may be divided to display first to Nth images (N is an integer greater than one);

the image generation section may generate images viewed from first to Nth virtual cameras as the first to Nth images;

the position determination section may determine whether or not the first to Nth virtual cameras or first to Nth player's characters exist within the effect range set based on the occurrence position of the effect event; and only when the position determination section determines that a Kth ($1 \leq K \leq N$) virtual camera of the first to Nth virtual cameras or a Kth player's character of the first to Nth player's characters exists within the effect range, the effect position processing section may position at least the effect object positioned outside the field of view of the Kth virtual camera or the dummy effect object provided in advance within the field of view of the Kth virtual camera.

In this case, when it is determined that the Lth ($1 \leq L \leq N$) virtual camera of the first to Nth virtual cameras or the Lth player's character does not exist within the effect range, the effect object is positioned (at the original position) without moving the effect object when generating an image viewed from the Lth virtual camera, and the dummy effect object is not positioned within the field of view of the Lth virtual camera.

This enables the player to reliably recognize that the player's object is involved in the effect by changing the position of the effect object or positioning the dummy effect object in the player's image affected by the effect, and realizes consistent image representation by allowing the effect object to remain positioned at the event occurrence position in the player's image viewed from another virtual camera (viewpoint).

According to one embodiment of the invention, there is provided an image generation system for generating an image, the image generation system comprising:

an event occurrence determination section which determines whether or not an effect event has occurred, an effect object being generated in the effect event;

a position determination section which determines whether or not a virtual camera or a player's character operated by a player exists within a given effect range, when the event occurrence determination section determines that the effect event has occurred, the effect range being set based on an occurrence position of the effect event;

a virtual camera control section which changes a position of the virtual camera so that at least the effect object positioned outside a field of view of the virtual camera becomes to be within the field of view of the virtual camera, when the event occurrence determination section determines that the virtual camera or the player's character exists within the effect range; and an image generation section which generates an image viewed from the virtual camera in an object space.

According to one embodiment of the invention, there is provided a program product causing a computer to function as the above-described sections.

In the above embodiments, an image in which the effect object is represented so that the player reliably recognizes that the effect event has occurred near the virtual camera or the player's character can be generated by moving (changing) the position of the virtual camera when the effect event has occurred so that the effect object positioned outside the field of view of the virtual camera (given viewpoint) is positioned within the field of view of the virtual camera.

These embodiments of the invention will be described in detail below. Note that the embodiments described below do not in any way limit the scope of the invention laid out in the claims herein. In addition, not all of the elements of the embodiments described below should be taken as essential requirements of the invention.

1. Configuration

FIG. 1 shows an example of a functional block diagram of an image generation system (game system) according to one embodiment of the invention. The image generation system according to the embodiment may be configured to exclude some of the constituent elements (sections) shown in FIG. 1.

An operating section 160 allows a player to input operational data on a player's object (player's character operated by the player). The function of the operating section 160 may be realized by a lever, a button, a steering wheel, a microphone, a touch panel type display, a casing, or the like. A storage section 170 functions as a work area for a processing section 100, a communication section 196, and the like. The function of the storage section 170 may be realized by a RAM (VRAM) or the like.

An information storage medium 180 (computer-readable medium; an example of a program product) stores a program, data, and the like. The function of the information storage medium 180 may be realized by an optical disk (CD or DVD), a magneto-optical disk (MO), a magnetic disk, a hard disk, a magnetic tape, a memory (ROM), or the like. The processing section 100 performs various types of processing according to the embodiment based on a program (data) stored in the information storage medium 180. Specifically, a program for causing a computer to function as each section according to the embodiment (program for causing a computer to execute processing of each section) is stored in the information storage medium 180.

A display section 190 outputs an image generated according to the embodiment. The function of the display section 190 may be realized by a CRT, an LCD, a touch panel type display, a head mount display (HMD), or the like. A sound output section 192 outputs sound generated according to the embodiment. The function of the sound output section 192 may be realized by a speaker, a headphone, or the like.

A portable information storage device 194 stores player's personal data, game save data, and the like. As the portable information storage device 194, a memory card, a portable game device, and the like can be given. The communication section 196 performs various types of control for communicating with the outside (e.g. host device or another image generation system). The function of the communication section 196 may be realized by hardware such as various processors or communication ASIC, a program, or the like.

The program (data or program product) for causing a computer to function as each section according to the embodiment may be distributed to the information storage medium 180 (storage section 170) from an information storage medium included in a host device (server) through a network and the communication section 196. Use of the information storage medium of the host device (server) may be included within the scope of the invention.

The processing section 100 (processor) performs processing such as game processing, image generation processing, or sound generation processing based on operational data from the operating section 160, a program, and the like. As the game processing, processing of starting a game when game start conditions are satisfied, processing of proceeding with a game, processing of positioning an object such as a character or a map, processing of displaying an object, processing of calculating game results, processing of ending a game when game end conditions are satisfied, and the like can be given. The processing section 100 performs various types of processing using a main storage section 171 in the storage section 170 as a work area. The function of the processing section 100 may be realized by hardware such as various processors (e.g. CPU or DSP) or ASIC (e.g. gate array), or by a program.

The processing section 100 includes an object space setting section 110, a movement-action processing section 112, a virtual camera control section 114, an event occurrence determination section 116, a position determination section 118, an effect position processing section 120, a hit determination section 122, an image generation section 130, and a sound generation section 140. The processing section 100 may be configured to exclude some of these sections.

The object space setting section 110 performs processing of positioning various objects (objects formed by a primitive surface such as a polygon, free-form surface, or subdivision surface) representing display objects such as a character, building, stadium, car, tree, pillar, wall, or map (topography) in an object space. Specifically, the object space setting section 110 determines the position and the rotational angle (synonymous with orientation or direction) of an object in a world coordinate system, and positions the object at the determined position (X, Y, Z) and the determined rotational angle (rotational angles around X, Y, and Z axes).

The movement-action processing section 112 performs a movement-action calculation (movement-action simulation) of an object (e.g. character, car, or airplane). Specifically, the movement-action processing section 112 performs processing of causing an object (player's object; object representing the player's character) to move in the object space or to show action (motion or animation) based on the operational data input by the player using the operating section 160, a program (movement-action algorithm), various types of data (motion data), and the like. In more detail, the movement-action processing section 112 performs simulation processing of sequentially calculating movement information (position, rotational angle, speed, or acceleration) and motion information (position or rotational angle of each part object) on the object in frame (1/60 sec) units. The frame is a time unit for performing the movement-action processing (simulation processing) of the object or the image generation processing.

The virtual camera control section 114 performs processing of controlling a virtual camera (viewpoint) for generating an image viewed from a given (arbitrary) viewpoint in the object space. In more detail, the virtual camera control section 114 performs processing of controlling the position (X, Y, Z) or the rotational angle (rotational angles around X, Y, and Z axes) of the virtual camera (processing of controlling the viewpoint position or the line-of-sight direction).

In the case of imaging an object (e.g. character, ball, or car) from behind using the virtual camera, the virtual camera control section 114 controls the position or the rotational angle (orientation of the virtual camera) of the virtual camera so that the virtual camera follows a change in the position or the rotation of the object. In this case, the virtual camera control section 114 may control the virtual camera based on information such as the position, the rotational angle, or the speed of the object obtained by the movement-action processing section 112. Or, the virtual camera control section 114 may control the virtual camera so that the virtual camera is rotated at a predetermined rotational angle or moved along a predetermined path. In this case, the virtual camera control section 114 controls the virtual camera based on virtual camera data for specifying the position (moving path) or the rotational angle of the virtual camera. When a plurality of virtual cameras (viewpoints) exist, the above-described control processing is performed for each virtual camera.

In the embodiment, when the position determination section 118 described later has determined that the virtual camera or the player's character exists within an effect range, the virtual camera control section 114 may move the position of the virtual camera so that at least an effect object positioned outside the field of view of the virtual camera exists within the field of view of the virtual camera.

The event occurrence determination section 116 determines whether or not an effect event which causes an effect object to be generated has occurred. The effect event may be caused to occur according to a program when given conditions are satisfied, or may be caused to occur based on the player's intention by allowing the player to explode a bomb by operating the character, for example.

When the event occurrence determination section 116 has determined that the effect event has occurred, the position determination section 118 determines whether or not the virtual camera or the player's character (player's object) operated by the player exists within a given effect range set based on the occurrence position of the effect event. Specifically, when the virtual camera or the player's character exists within the effect range, the effect object may be positioned outside the field of view of the virtual camera. This means that it may be necessary to change the position of the effect object (or position a dummy effect object). The effect range used herein refers to a range of which the size can be individually set corresponding to the type of the effect. For example, the effect range may indicate a range in which the effect represented by the effect object can be seen (e.g. size of explosion). The hit determination section 122 described later uses the effect range as a hit check range. When a plurality of virtual cameras (viewpoints) exist, the above-described determination processing is performed for each virtual camera.

When the position determination section 118 has determined that the virtual camera or the player's character exists within the effect range, the effect position processing section 120 moves and positions at least the effect object positioned outside the field of view (synonymous with the angle of view) of the virtual camera within the field of view of the virtual camera. This enables the player to reliably recognize the effect event which has occurred near the virtual camera or the player's character.

When a plurality of effect objects are generated based on the effect event, the effect position processing section 120 moves and positions each effect object without changing at least the positioning order of the effect objects in the depth direction in the camera coordinate system (synonymous with Z-sort order). This prevents a situation in which the generated image becomes inconsistent due to the positioning disorder of each object caused by a change in position of the effect objects.

For example, a space between a first boundary surface set in front of the virtual camera in the camera coordinate system and a second boundary surface set behind the virtual camera in the camera coordinate system is set as a given depth range. The depth information on each effect object in the camera coordinate system is calculated based on the ratio of a first distance between the first boundary surface and the screen to a second distance between the first boundary surface and the second boundary surface so that the effect objects are positioned between the first boundary surface and the screen, and each effect object positioned within the given depth range is moved and positioned based on the calculated depth information.

When the position determination section 118 has determined that the virtual camera or the player's character exists within the effect range, the effect position processing section 120 performs processing of reading a dummy effect object corresponding to at least the effect object positioned outside the field of view (synonymous with the angle of view) of the virtual camera from a dummy effect object data storage section 179 in the storage section 170, and positioning the dummy effect object within the field of view of the virtual camera. This also enables the player to reliably recognize the effect event which has occurred near the virtual camera or the player's character.

When a plurality of effect objects are generated based on the effect event, the effect position processing section 120 positions a dummy effect object corresponding to each effect object within the field of view of the virtual camera according to at least the positioning order of the effect objects in the depth direction in the camera coordinate system (synonymous with Z-sort order). This prevents the generated image from becoming inconsistent, since the positioning order of the dummy effect objects coincides with the positioning order of the corresponding effect objects.

For example, a space between the first boundary surface set in front of the virtual camera in the camera coordinate system and the second boundary surface set behind the virtual camera in the camera coordinate system is set as a given depth range. The depth information on each effect object in the camera coordinate system, when a plurality of effect objects are positioned between the first boundary surface and the screen, is calculated based on the ratio of the first distance between the first boundary surface and the screen to the second distance between the first boundary surface and the second boundary surface, and a dummy effect object corresponding to each effect object positioned within the given depth range is positioned within the field of view of the virtual camera based on the calculated depth information.

When a plurality of virtual cameras (viewpoints) exist, whether or not to change the position of the effect object (or, whether or not to position the dummy effect object) is determined for each virtual camera. In the case of a virtual camera which is determined to exist within the effect range (virtual camera which follows the player's character which exists within the effect range), at least the effect object positioned outside the field of view of the virtual camera (or the dummy effect object corresponding to the effect object positioned outside the field of view of the virtual camera) is positioned within the field of view of the virtual camera. In the case of a virtual camera which is determined not to exist within the effect range (virtual camera which follows the player's character which does not exist within the effect range), the effect object is positioned (at the original position) without moving the effect object (or without positioning the dummy effect object).

The hit determination section 122 performs hit determination processing (hit check) between the objects. For example, the hit determination section 122 performs hit determination between the effect object generated by the effect event and another object (player's object) using the above-described effect range.

The image generation section 130 performs drawing processing based on results for various types of processing (game processing) performed by the processing section 100 to generate an image, and outputs the image to the display section 190. When generating a three-dimensional game image, geometry processing such as coordinate transformation (world coordinate transformation or camera coordinate transformation), clipping processing, or perspective transformation is performed, and drawing data (e.g. positional coordinates of vertices of primitive surface, texture coordinates, color data, normal vector, or α-value) is created based on the processing results. The object (one or more primitive surfaces) after perspective transformation (after geometry processing) is drawn in a drawing buffer 173 (buffer which can store image information in pixel units, such as a frame buffer or an intermediate buffer; VRAM) based on the drawing data (primitive surface data). This causes an image viewed from the virtual camera (given viewpoint) in the object space to be generated. When a plurality of virtual cameras (viewpoints) exist, an image viewed from each virtual camera is generated so that the images can be displayed on one screen as divided images.

The image generation section 130 includes a texture mapping section 132, a translucent processing section 134, and a hidden surface removal section 136.

The texture mapping section 132 performs processing of mapping a texture (texel value) stored in a texture storage section 175 onto the object. In more detail, the texture mapping section 132 reads a texture (surface properties such as color and α-value) from the texture storage section 175 using the texture coordinates set (assigned) to the vertices of the object (primitive surface) or the like. The texture mapping section 132 maps the texture which is a two-dimensional image or pattern onto the object. In this case, the texture mapping section 132 performs processing of associating the pixel with the texel, bilinear interpolation (texel interpolation), or the like.

The translucent processing section 134 performs translucent blending processing (e.g. normal α-blending, additive α-blending, or subtractive α-blending) based on the α-value (A value). In the case of normal α-blending, the translucent processing section 134 performs processing indicated by the following equations.

$$R_Q=(1-\alpha)\times R_1+\alpha\times R_2 \qquad (1)$$

$$G_Q=(1-\alpha)\times G_1+\alpha\times G_2 \qquad (2)$$

$$B_Q=(1-\alpha)\times B_1+\alpha\times B_2 \qquad (3)$$

In the case of additive α-blending, the translucent processing section 134 performs processing indicated by the following equations.

$$R_Q=R_1+\alpha\times R_2 \qquad (4)$$

$$G_Q=G_1+\alpha\times G_2 \qquad (5)$$

$$B_Q=B_1+\alpha\times B_2 \qquad (6)$$

$R_1$, $G_1$, and $B_1$ are RGB components of the image (original image) which has been drawn in the drawing buffer 173, and $R_2$, $G_2$, and $B_2$ are RGB components of the image to be drawn in the drawing buffer 173. $R_Q$, $G_Q$, and $B_Q$ are RGB components of the image obtained by α-blending. The α-value is information which can be stored while being associated with each pixel (texel or dot), and is additional information other than the color information. The α-value may be used as mask information, translucency (equivalent to transparency or opacity), bump information, or the like.

In the embodiment, the translucent blending processing is performed so that the transparency of the effect object is increased as the position of the effect object comes closer to the position of the screen or the position of the virtual camera based on the depth information on the effect object moved and positioned by the effect position processing section 120 (or the dummy effect object read from the dummy effect object data storage section 179) in the camera coordinate system. This prevents the character represented in the image from becoming difficult to see. If the transparency of the effect object is increased as the effect object comes closer to the position of the screen, the effect can be prevented from being represented to inconsistently disappear, even if the virtual camera (viewpoint) is moved together with the character.

The hidden surface removal section 136 performs hidden surface removal processing by a Z-buffer method (depth comparison method or Z test) using a Z-buffer 177 (depth buffer) in which the Z-value (depth information) of each pixel is stored. Specifically, the hidden surface removal section 136 refers to the Z-value stored in the Z-buffer 177 when drawing each pixel of the primitive surface of the object. The hidden surface removal section 136 compares the Z-value in the Z-buffer 177 and the Z-value of the drawing target pixel of the primitive surface, and, when the Z-value of the drawing target pixel is the Z-value in front of the virtual camera (e.g. small Z-value), performs the drawing processing of that pixel and updates the Z-value in the Z-buffer 177 with a new Z-value.

The sound generation section 130 performs sound processing based on the results for various types of processing performed by the processing section 100. The sound generation section 130 generates game sound such as background music, effect sound, or voice, and outputs the generated sound to the sound output section 192.

The image generation system according to the embodiment may be a system exclusive to a single-player mode in which only one player can play the game, or may be a system provided with a multi-player mode in which a plurality of players can play the game. When a plurality of players play the game, game images and game sound provided to the players may be generated using one terminal, or may be generated by distributed processing using a plurality of terminals (game devices or portable telephones) connected through a network (transmission line or communication line) or the like.

2. Method

A method according to the embodiment is described below with reference to the drawings. The following description mainly illustrates the case where the method according to the embodiment is employed when representing an explosion effect in a game image. However, the method according to the embodiment may be applied not only to representation of the game image, but also to various types of image representation.

Figure 2A:
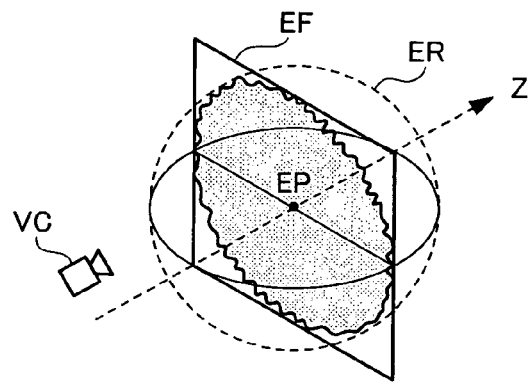
FIGS. 2A to 2C are illustrative of a method according to one embodiment of the invention.
Figure 2B:
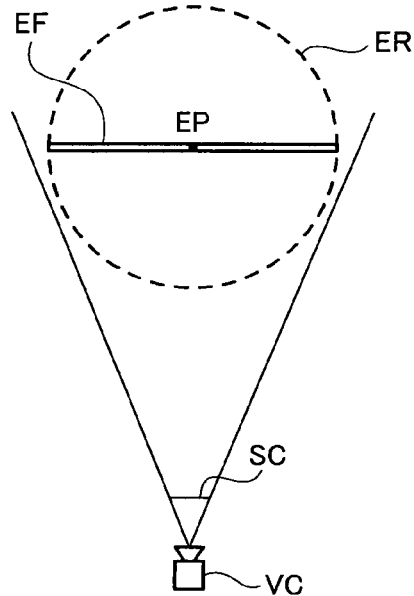
Figure 2C:
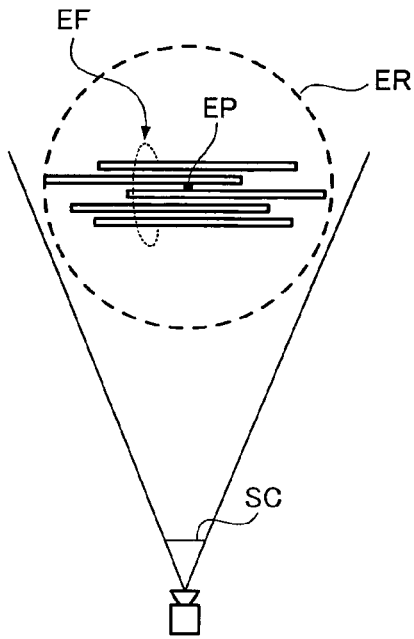

FIGS. 2A to 2C show an example of an effect object EF used in the embodiment. The effect object EF is an object which imitatively represents a special effect caused by various effect events which occur at a given position in the object space. As the types of the effect object EF, an explosion representation object, a flame representation object, a smoke representation object, a thunder representation object, other special effect representation objects, and the like can be given. A texture which represents an effect (explosion, flame, smoke, or thunder) is mapped onto the effect object EF. The effect object EF is a sprite polygon (billboard polygon) which is positioned in the three-dimensional object space so that the effect object EF is perpendicular to a virtual camera VC (so that the angle formed by the normal vector of the billboard primitive surface and the line-of-sight direction vector of the virtual camera is 180°). Specifically, the effect is three-dimensionally represented in the embodiment by projection-transforming a sprite polygon, onto which the effect representation texture is mapped, onto a screen SC.

In the embodiment, the effect can be represented by positioning the effect object EF at an effect occurrence position EP as one sprite polygon, as shown in FIG. 2B. As the effect representation method, a particle system as shown in FIG. 2C may be employed. According to the particle system, attribute information such as the position or color is assigned to a plurality of particles, and an amorphous effect such as explosion, flame, or smoke can be represented by a set of particles which occur, move, and disappear according to a given rule. In this case, the particle may be formed by a sprite polygon.

An effect range ER having the effect occurrence position EP as the center is set for the effect object EF corresponding to the effect event. In the embodiment, the effect range ER is used to determine the position of the virtual camera VC, and may be used as a hit check range for performing hit determination between the effect object EF and another object.

Figure 3A:
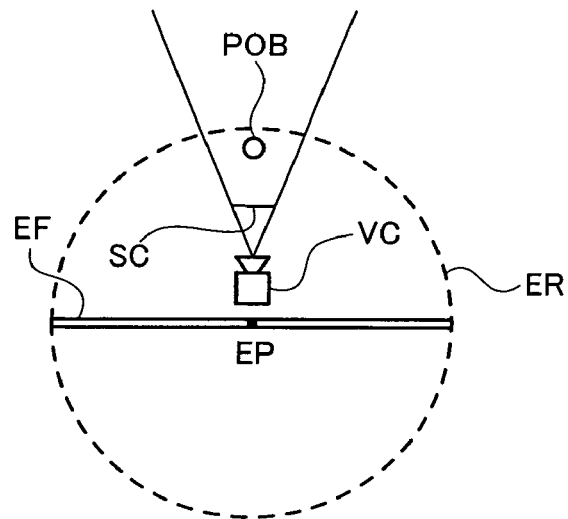
FIGS. 3A to 3C are illustrative of a method according to one embodiment of the invention.
Figure 3B:
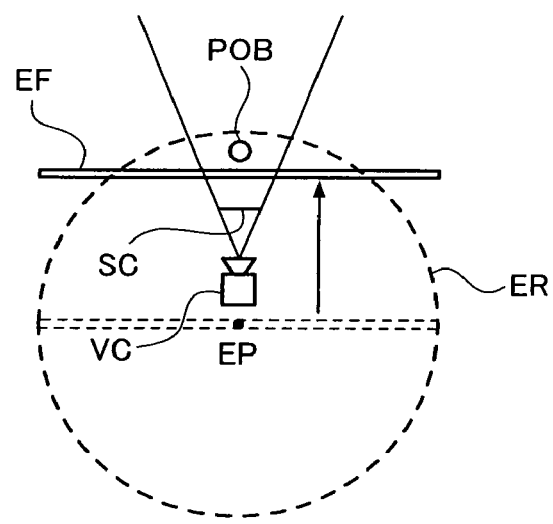

In the embodiment, processing of moving and positioning the effect object EF positioned outside the field of view of the virtual camera VC within the field of view of the virtual camera VC is performed when predetermined conditions are satisfied. FIGS. 3A and 3B show a method of changing the position of the effect object EF performed in the embodiment.

For example, consider the case where the virtual camera VC is set so that the virtual camera VC images a player's object POB which represents a character operated by the player from behind.

When an effect event (e.g. explosion event) having the effect range ER has occurred at the position EP behind the virtual camera VC, the effect object EF is positioned near the effect occurrence position EP, as shown in FIG. 3A. In this case, the effect object EF is positioned behind the screen SC. Specifically, since the effect object EF is positioned outside the field of view of the virtual camera VC, the effect is not represented in the image viewed from the virtual camera VC. If the effect range ER is set as the hit check range for applying hit damage to the character represented by another object, a situation occurs in which the player's character undergoes hit damage even though the player does not recognize that the player's object POB is involved in the effect.

In the embodiment, when the virtual camera VC exists within the effect range ER of the effect object EF and the effect object EF is positioned outside the field of view of the virtual camera VC as shown in FIG. 3A, the effect object EF is moved and positioned within the field of view of the virtual camera VC as shown in FIG. 3B so that the player can recognize the effect. In more detail, the effect object EF is moved within the field of view of the virtual camera VC by calculating the depth information on the effect object EF in the camera coordinate system (Z-value in the camera coordinate system) so that the effect object EF is positioned in front of at least the screen SC.

The method according to the embodiment enables generation of an image in which the effect is represented so that the player reliably recognizes that the effect event has occurred near the virtual camera VC or the player's object POB by positioning the effect object EF positioned outside the field of view of the virtual camera VC within the field of view of the virtual camera VC when the effect event has occurred.

Figure 3C:
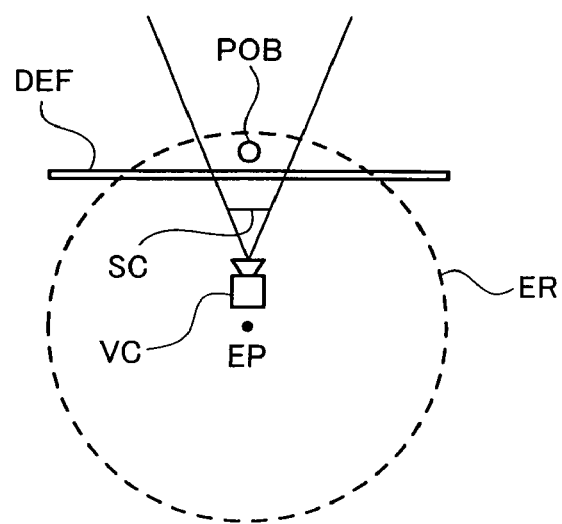

In the embodiment, instead of moving the effect object EF within the field of view of the virtual camera VC as shown in FIG. 3B, a method of positioning a dummy effect object DEF provided in advance within the field of view of the virtual camera VC as shown in FIG. 3C may also be employed. The dummy effect object DEF is a sprite polygon onto which an effect representation texture similar to that of the effect object EF is mapped. This also enables generation of an image in which the effect is represented so that the player reliably recognizes that the effect event has occurred near the virtual camera VC or the player's object POB in the same manner as in the case shown in FIG. 3B.

In the embodiment, instead of moving and positioning the effect object EF or generating the dummy effect object DEF as described above, the virtual camera VC may be moved so that the player recognizes the effect object EF which is originally positioned outside the field of view of the virtual camera VC.

Figure 4A:
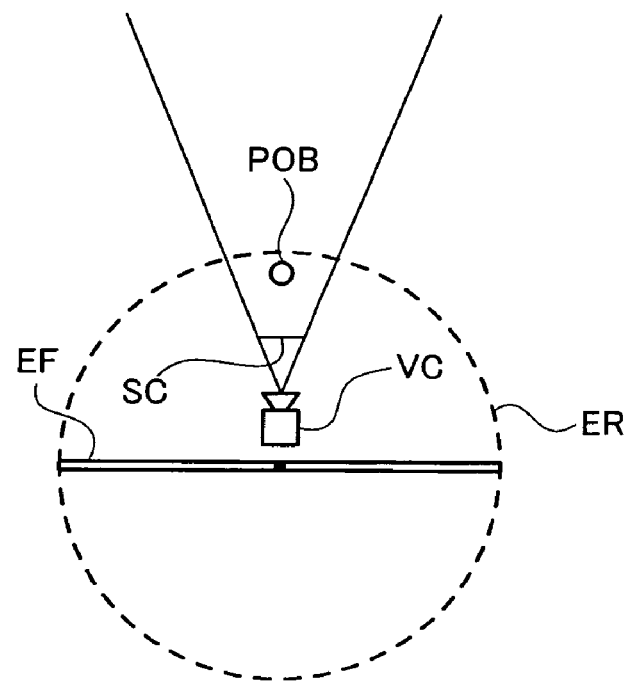
FIGS. 4A and 4B are illustrative of a method according to one embodiment of the invention.
Figure 4B:
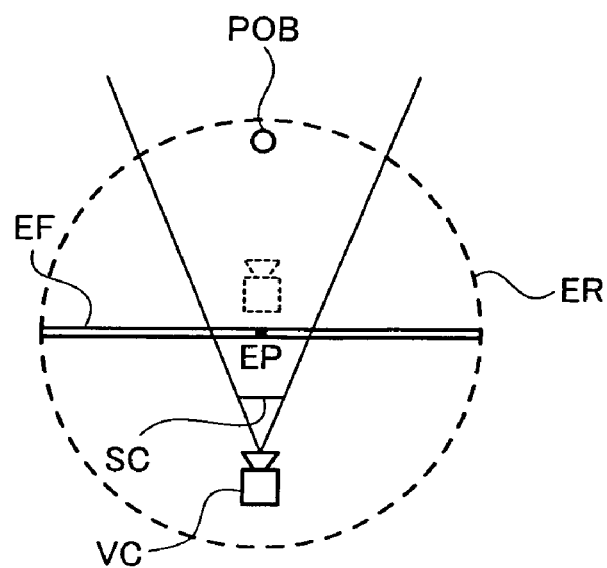

For example, when the effect object EF is positioned behind the virtual camera VC as shown in FIG. 4A, the position of the virtual camera VC (viewpoint position) is moved so that the effect object EF is positioned in front of at least the screen SC (so that at least the screen SC is positioned behind the effect object EF), as shown in FIG. 4B. This enables the player to recognize the effect object EF positioned within the field of view of the virtual camera VC without moving the effect object EF or generating the dummy effect object DEF.

The method according to the embodiment is also useful when employing the particle system in which the effect is represented using a plurality of effect objects as shown in FIG. 2C.

Figure 5A:
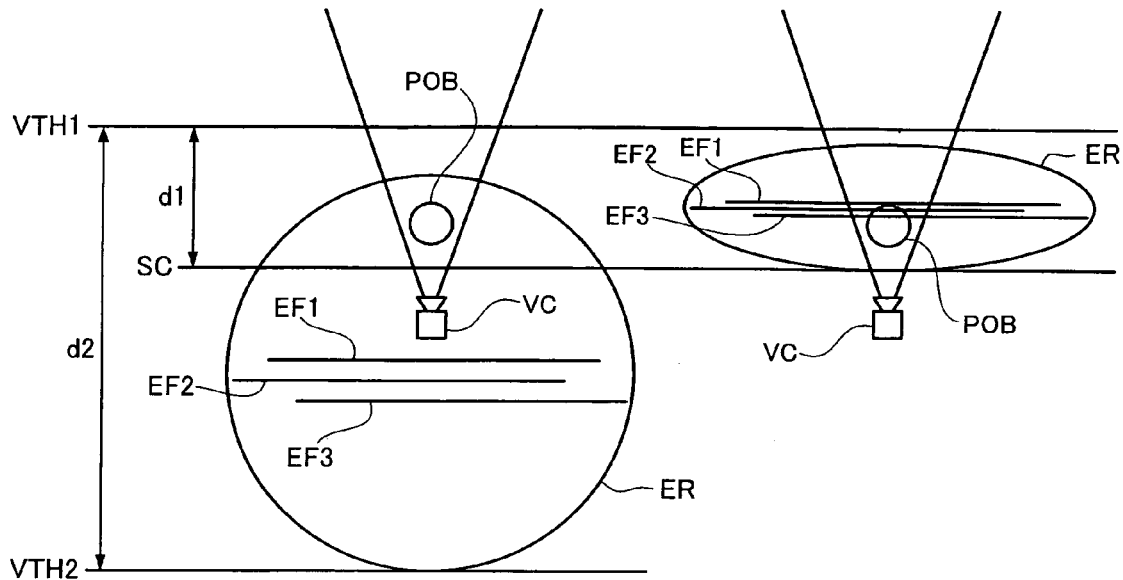
FIGS. 5A and 5B are illustrative of a method according to one embodiment of the invention.

FIG. 5A shows an example of changing the positions of effect objects EF1 to EF3 when representing an effect such as explosion using a plurality of effect objects EFn (n=1, 2, 3 . . . ). In this case, each effect object EFn is moved and positioned without changing at least the positioning order (Z-sort order) of the effect objects EF1 to EF3 in the depth direction in the camera coordinate system. This prevents the generated image from becoming inconsistent due to the positioning disorder of the effect objects EF1 to EF3.

In more detail, a first boundary surface VTH1 is set at a position in front of the virtual camera VC, and a second boundary surface VTH2 is set at a position behind the virtual camera VC. The relative positional relationship of the first boundary surface VTH1 and the second boundary surface VTH2 with the virtual camera VC may be fixed or may be changed corresponding to the effect event occurred. When changing the relative positional relationship of the first boundary surface VTH1 and the second boundary surface VTH2 with the virtual camera VC, the positions of the first boundary surface VTH1 and the second boundary surface VTH2 may be set corresponding to the size (area) of the effect range ER, for example. The first boundary surface VTH1 and the second boundary surface VTH2 may be set as surfaces perpendicular to the virtual camera VC (or surfaces parallel to the screen SC).

In the example shown in FIG. 5A, when it is determined that the virtual camera VC exists within the effect range ER of the effect event occurred, the depth information (Z-value) on the effect objects EF1 to EF3 positioned within the depth range defined by the first boundary surface VTH1 and the second boundary surface VTH in the camera coordinate system is changed so that the effect objects EF1 to EF3 are moved and positioned between the first boundary surface VTH1 and the screen SC. In more detail, the depth information (Z-value) on the effect objects EF1 to EF3 in the camera coordinate system is calculated based on the ratio (d1/d2) of a first distance d1 between the first boundary surface VTH1 and the screen SC to a second distance d2 between the first boundary surface VTH1 and the second boundary surface VTH2 so that the effect objects EF1 to EF3 are positioned between the first boundary surface VTH1 and the screen SC, and the positions of the effect objects EF1 to EF3 are changed based on the calculated depth information.

This not only prevents the generated image from becoming inconsistent, but also prevents an increase in the processing load since the positions of only the effect objects EF1 to EF3 positioned within a given area defined by the first boundary surface VTH1 and the second boundary surface VTH2 are changed. According to the method shown in FIG. 4, since the positioning order (Z-sort order) of the effect objects EF1 to EF3 and the positioning interval ratio of the effect objects EF1 to EF3 are not changed, more consistent effect representation can be realized.

When positioning dummy effect objects DEF1 to DEF3 corresponding to the effect objects EF1 to EF3 instead of changing the positions of the effect objects EF1 to EF3, the effect objects DEF1 to DEF3 may be positioned based on the target positions of the effect objects EF1 to EF3, that is, the depth information (Z-value) in the camera coordinate system calculated based on the ratio (d1/d2) of the first distance d1 between the first boundary surface VTH1 and the screen SC to the second distance d2 between the first boundary surface VTH1 and the second boundary surface VTH2.

When employing the particle system in which the effect is represented using a plurality of effect objects, a method of moving the position of the virtual camera VC (viewpoint position) so that the effect objects EF1 to EF3 are positioned in front of the screen SC (so that the screen SC is positioned behind the effect objects EF1 to EF3) may be employed.

Figure 5B:
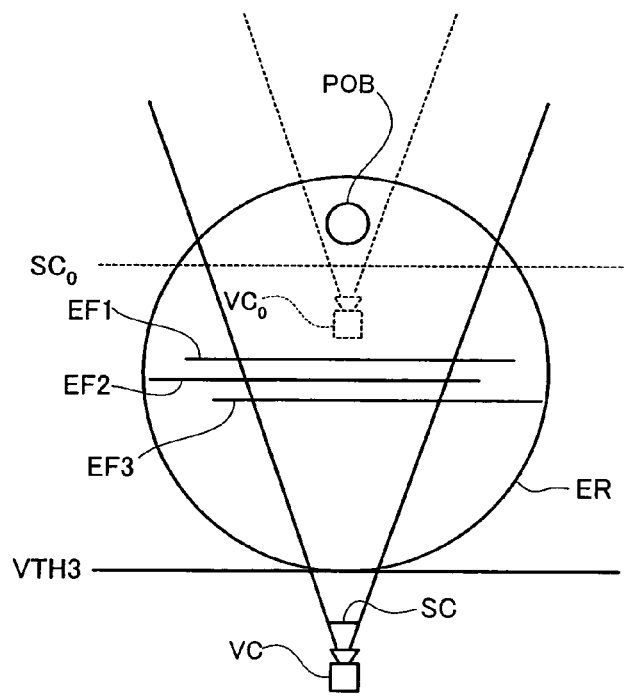

In more detail, a third boundary surface VTH3 is set behind the virtual camera VC as shown in FIG. 5B. The position of the virtual camera VC is calculated so that the effect objects EF1 to EF3 positioned between the position of a screen $SC_0$ set based on the position of a virtual camera $VC_0$ before being moved and the third boundary surface VTH3 are positioned within the field of view of the virtual camera VC, and the virtual camera VC is moved based on the calculated position. For example, the position of the virtual camera VC after being moved is set so that the screen SC is positioned behind the third boundary surface VTH3. It suffices that the position of the virtual camera VC after being moved may be set so that the screen SC is positioned behind at least the effect objects EF1 to EF3 positioned between the screen $SC_0$ and the third boundary surface VTH3.

The method according to the embodiment is also useful for the case of employing a multi-player game system in which first to Nth (N is an integer of two or more) images corresponding to first to Nth player's characters operated by first to Nth players are separately displayed on the display screen. In this case, images viewed from first to Nth virtual cameras VCN are generated as the first to Nth images.

Figure 6A:
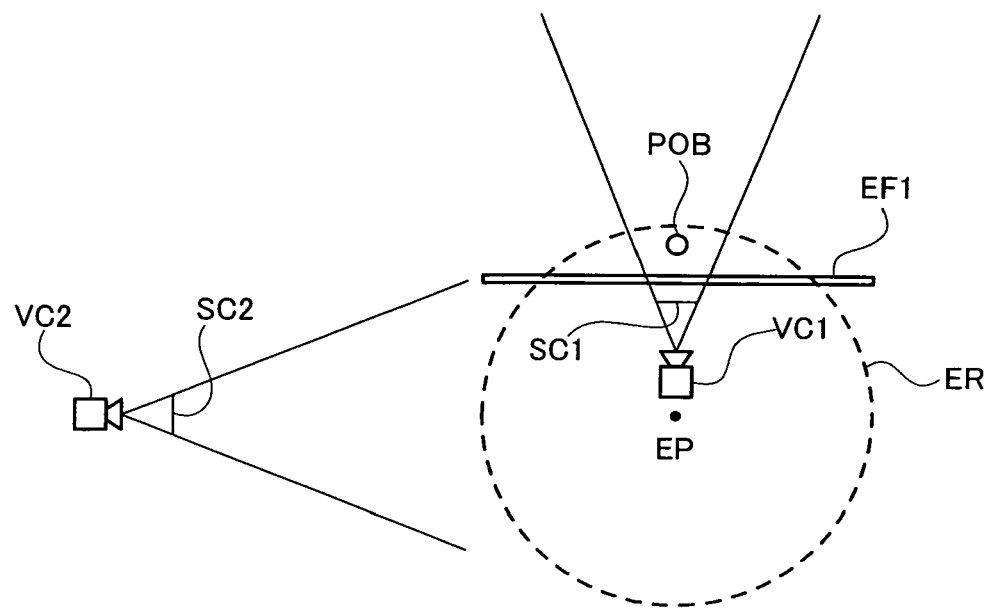
FIGS. 6A and 6B are illustrative of a method according to one embodiment of the invention.
Figure 6B:
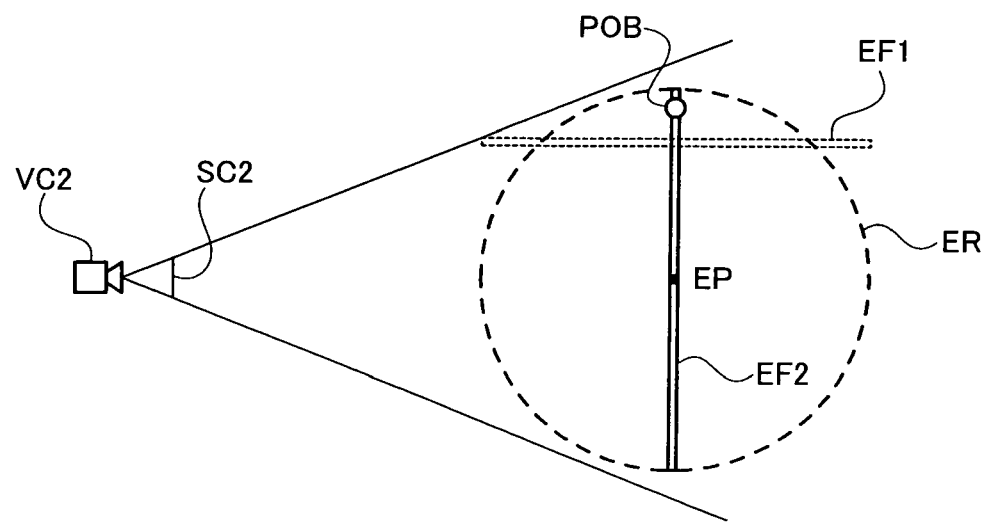

FIGS. 6A and 6B show the case where images viewed from a first virtual camera VC1 and a second virtual camera VC2 are generated as the first image and the second image, respectively. In this case, whether or not the first and second virtual cameras VC1 and VC2 exist within the effect range ER set based on the effect event occurrence position EP is determined.

Since the first virtual camera VC1 is determined to exist within the effect range ER as shown in FIG. 6A, at least the effect object EF1 positioned outside the field of view of the first virtual camera VC 1 is moved and positioned within the field of view of the first virtual camera VC 1 using the above-described method.

Since the second virtual camera VC2 is determined not to exist within the effect range ER, the effect object EF2 is not moved and is allowed to remain at the original position, as shown in FIG. 6B.

This enables the player to reliably recognize that the player's object POB is involved in the effect by changing the position of the effect object EF1 in the image viewed from the first virtual camera VC1 which follows the player's object POB which is involved in the effect (image projected onto the screen SC1), and realizes consistent image representation in which the player's object POB is involved in the effect without changing the position of the effect object EF2 based on the event occurrence position EP in the image viewed from the second virtual camera VC2 (image projected onto the screen SC2).

In the embodiment, the translucent blending processing is performed so that the transparency of the effect object EFn is increased as the position of the effect object EFn comes closer to the position of the screen SC based on the depth information (synonymous with Z-value or Z-coordinate) on the effect object EFn in the camera coordinate system. This prevents the player's object POB represented in the image from becoming difficult to see. If the transparency of the effect object EFn is increased as the effect object comes closer to the position of the screen, the effect can be prevented from being represented to inconsistently disappear, even if the virtual camera VC is moved together with the player's object POB accompanying the movement of the player's object POB.

Figure 7A:
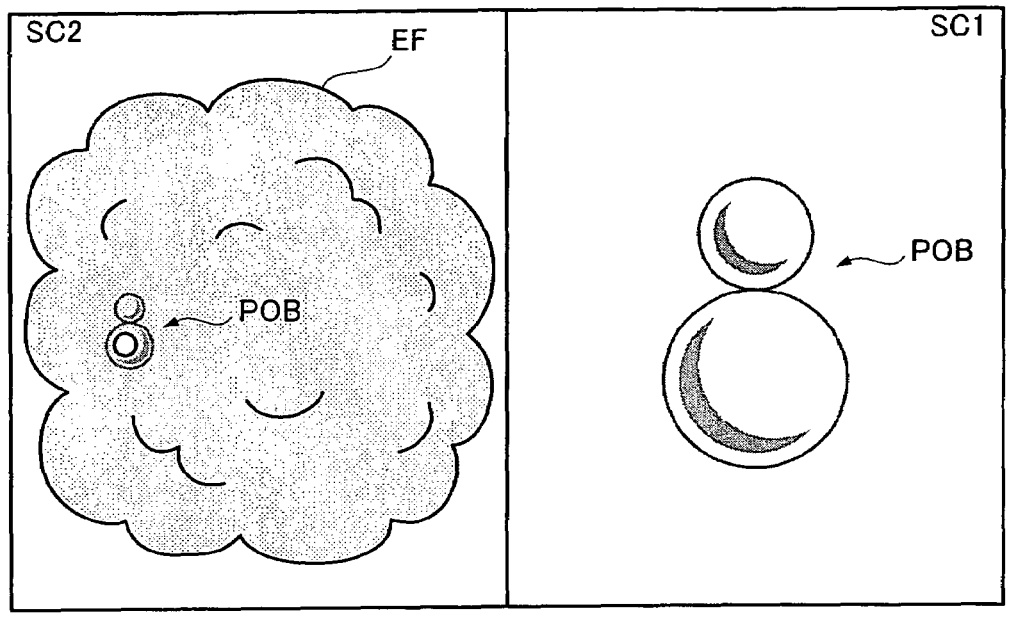
FIGS. 7A and 7B show examples of images generated by a method according to one embodiment of the invention.
Figure 7B:
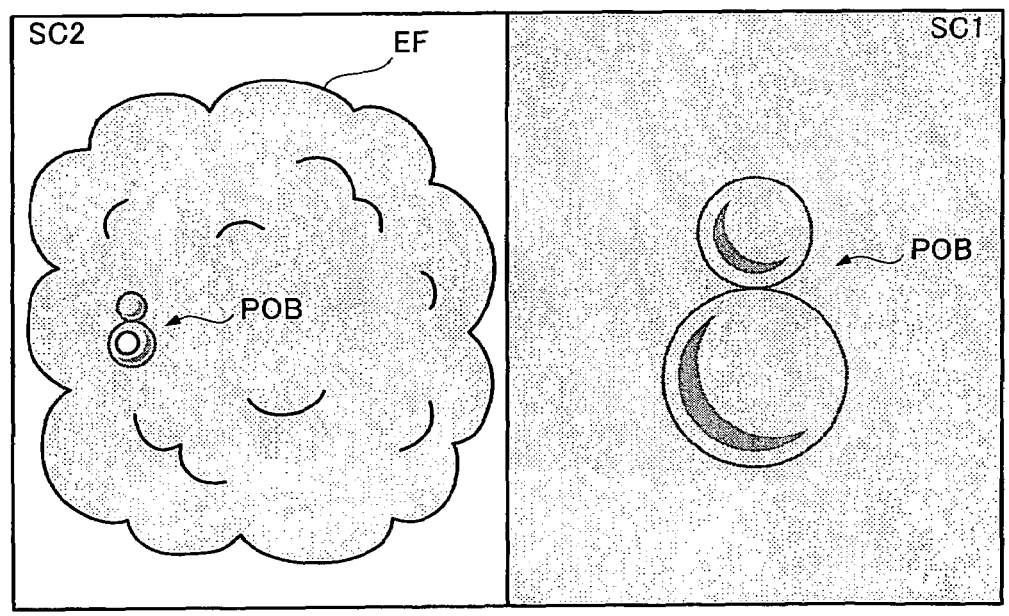
Figure 8A:
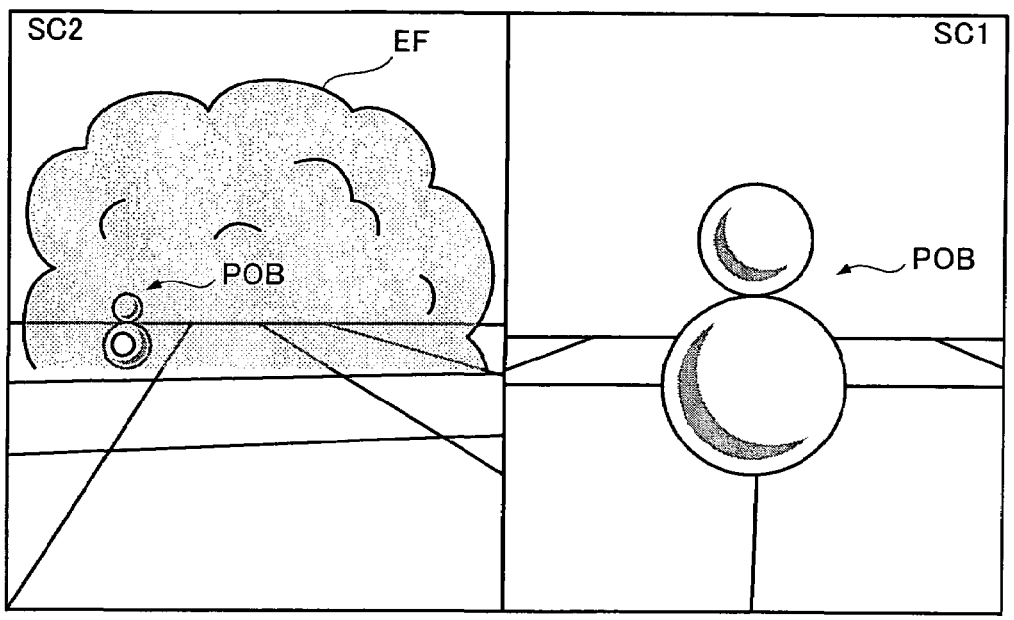
FIGS. 8A and 8B show examples of images generated by a method according to one embodiment of the invention.
Figure 8B:
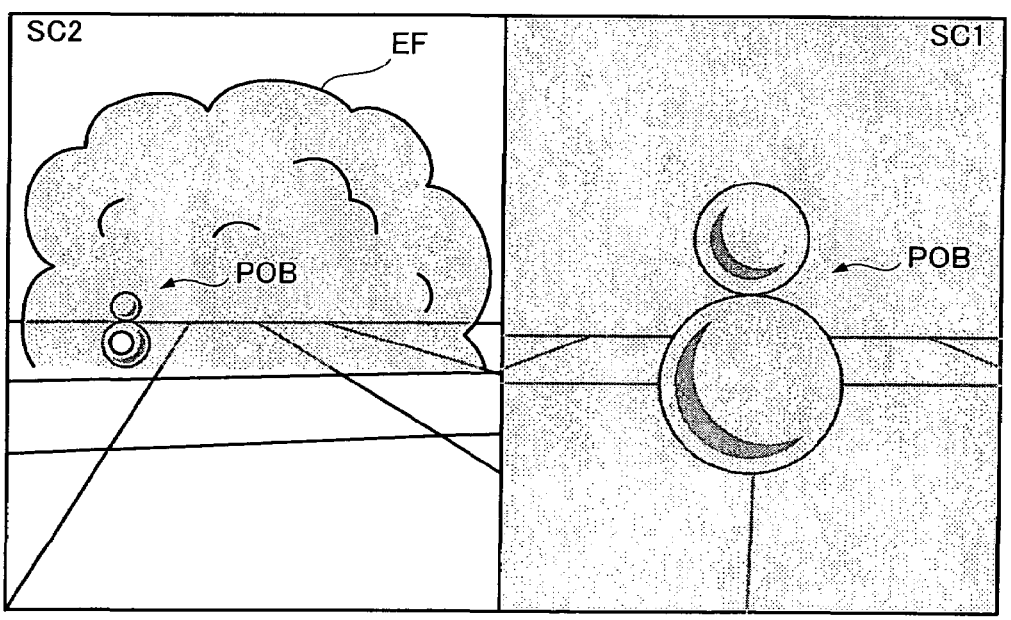

FIGS. 7A and 7B and FIGS. 8A and 8B show examples of images generated by using the method according to the embodiment. FIGS. 7A and 7B show examples of images when positioning only the player's object and the effect object in the object space. FIGS. 8A and 8B show images in which a background object such as a topographical object is synthesized with the images shown in FIGS. 7A and 7B using the Z-buffer method.

FIGS. 7A and 7B and FIGS. 8A and 8B represent the state described with reference to FIGS. 6A and 6B. FIGS. 7A and 8A show images before changing the position of the effect object EF, and FIGS. 7B and 8B show images after changing the position of the effect object EF. As shown in FIGS. 7A and 8A, when the position of the effect object EF is not changed, while the state in which the player's object POB is involved in the explosion effect is clearly represented in the image viewed from the second virtual camera VC2 (image projected onto the screen SC2), the state in which the player's object POB is involved in the explosion effect cannot be recognized in the image viewed from the first virtual camera VC1 (image projected onto the screen SC2).

On the other hand, when the position of the effect object EF has been changed using the method according to the embodiment as shown in FIGS. 7B and 8, the state in which the player's object POB is involved in the explosion effect is represented in the images viewed from both the first and second virtual cameras VC1 and VC2. As described above, the method according to the embodiment can realize realistic image representation based on the actual situation even using simple effect representation utilizing a sprite polygon.

3. Processing

A detailed processing example according to the embodiment is described below using flowcharts shown in FIGS. 9 and 10.

Figure 9:
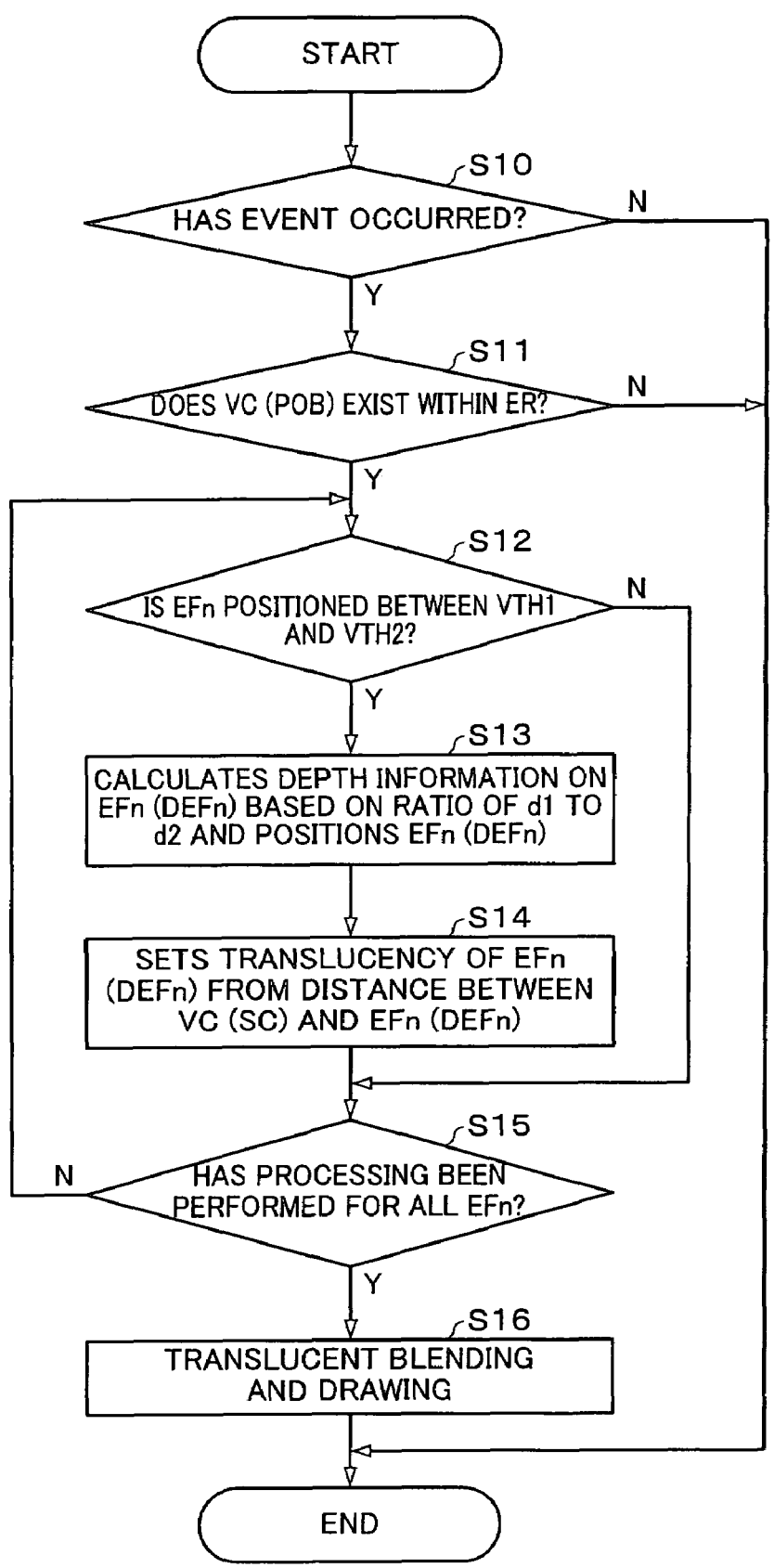
FIG. 9 is a flowchart of specific processing according to one embodiment of the invention.

FIG. 9 shows a processing example when changing the position of the effect object or positioning the dummy effect object.

The event occurrence determination section 116 determines whether or not the effect event which causes the effect object EFn to be generated has occurred (step S10). When it is determined that the effect event has occurred ("Y" in step S10), whether or not the virtual camera VC (or the player's object POB) exists within the effect range ER is determined (step S11). When it is determined that the virtual camera VC (or the player's object POB) exists within the effect range ER ("Y" in step S11), whether or not the effect object EFn generated is positioned between the first boundary surface VTH1 and the second boundary surface VTH2 is determined (step S12). When the effect object EFn is positioned between the first boundary surface VTH1 and the second boundary surface VTH2 ("Y" in step S12), the depth information (synonymous with Z-value or Z-coordinate) on the effect object EFn (or the dummy effect object DFn) in the camera coordinate system is calculated based on the ratio (d1/d2) of the first distance d1 between the first boundary surface VTH1 and the screen SC to the second distance d2 between the first boundary surface VTH1 and the second boundary surface VTH2 as shown in FIG. 5A, and the effect object EFn (or the dummy effect object DFn) is positioned according to the calculated depth information (step S13). The translucency of each object is set from the distance between the virtual camera VC (or the screen SC) and the effect object EFn after being moved (or the dummy effect object DEFn positioned) (step S14). In more detail, the translucency of each object is set so that the translucency of the object positioned closer to the virtual camera VC (or the screen SC) is increased. After the processing from the step S12 to the step S14 has been performed for all the effect objects EFn ("Y" in step S15), each object is subjected to translucent blending and written into the drawing buffer to finish the processing (step S16). The method according to the embodiment is realized by the above-described processing.

Figure 10:
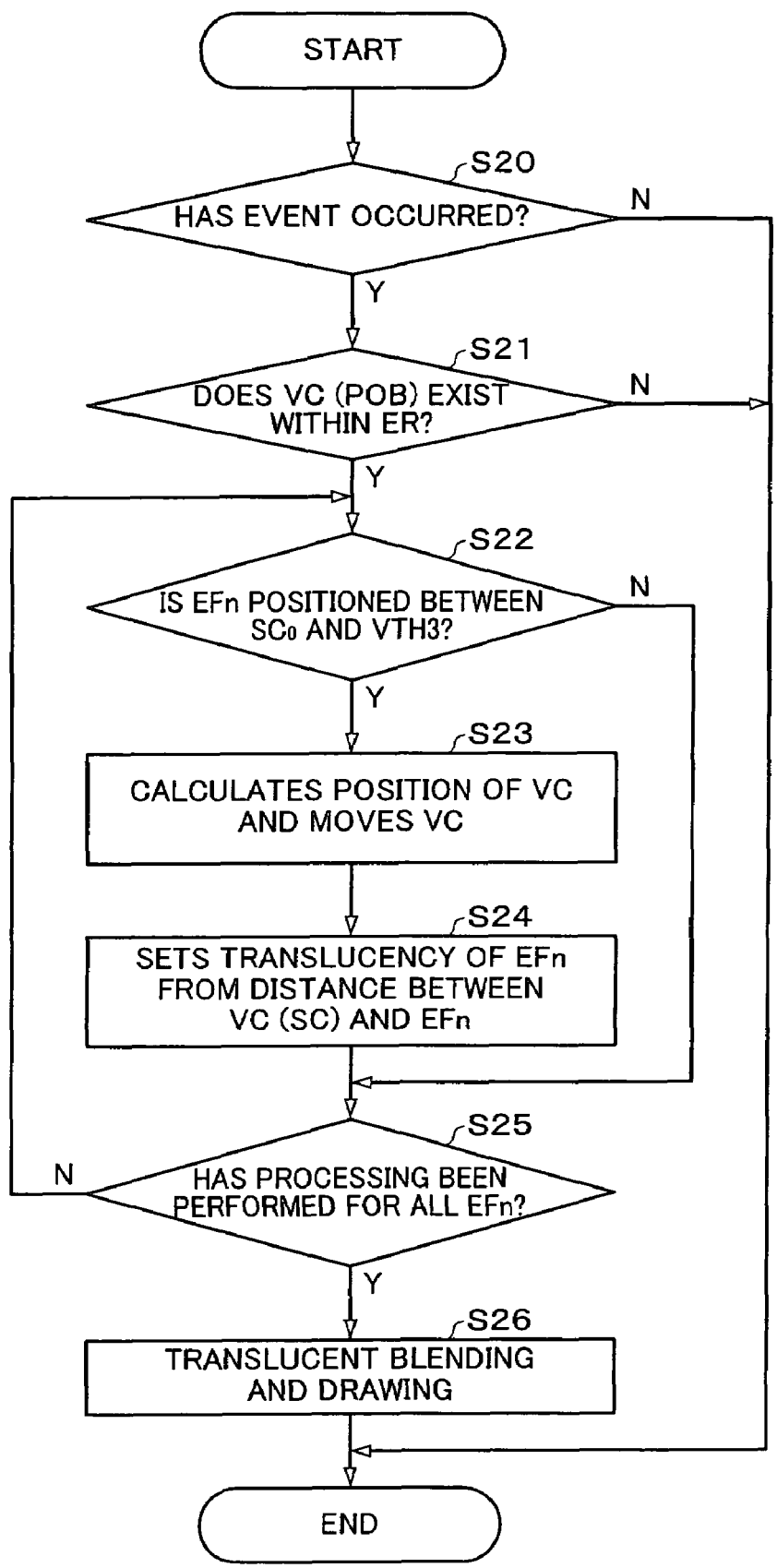
FIG. 10 is a flowchart of specific processing according to one embodiment of the invention.

FIG. 10 shows a processing example when moving the virtual camera.

The event occurrence determination section 116 determines whether or not the effect event which causes the effect object EFn to be generated has occurred (step S20). When it is determined that the effect event has occurred ("Y" in step S20), whether or not the virtual camera VC (or the player's object POB) exists within the effect range ER is determined (step S21). When it is determined that the virtual camera VC (or the player's object POB) exists within the effect range ER ("Y" in step S21), whether or not the effect object EFn generated is positioned between the screen $SC_0$ and the third boundary surface VTH3 is determined (step S22). When the effect object EFn is positioned between the screen $SC_0$ and the third boundary surface VTH3 ("Y" in step S22), the position of the virtual camera VC at which the screen SC is positioned behind the third boundary surface VTH3 is calculated, and the virtual camera VC is moved and positioned at the calculated position (step S23). The translucency of each object is set from the distance between the virtual camera VC (or the screen SC) after being moved and the effect object EFn (step S24). In more detail, the translucency of each object is set so that the translucency of the object positioned closer to the virtual camera VC (or the screen SC) after being moved is increased. After the processing from the step S22 to the step S24 has been performed for all the effect objects EFn ("Y" in step S25), each object is subjected to translucent blending and written into the drawing buffer to finish the processing (step S26). The method according to the embodiment is realized by the above-described processing.

4. Hardware Configuration

Figure 11:
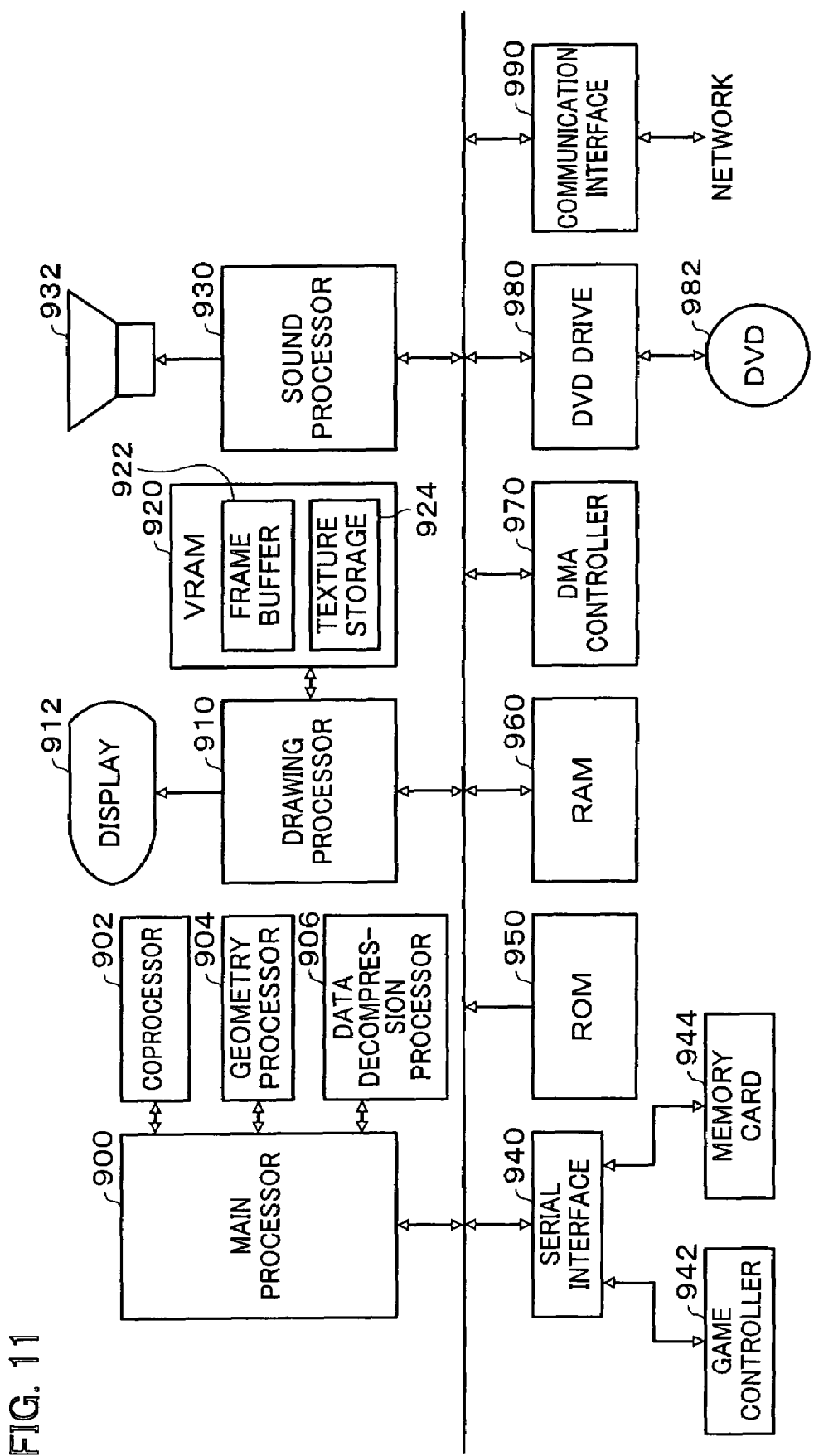
FIG. 11 shows an example of hardware configuration.

FIG. 11 shows a hardware configuration example which can realize the embodiment. A main processor 900 operates based on a program stored in a CD 982 (information storage medium), a program downloaded through a communication interface 990, a program stored in a ROM 950, or the like, and performs game processing, image processing, sound processing, or the like. A coprocessor 902 assists the processing of the main processor 900, and performs a matrix calculation (vector calculation) at a high speed. In the case where matrix calculation processing is necessary for physical simulation for causing an object to move or show action, a program which operates on the main processor 900 directs (requests) the coprocessor 902 to perform the processing.

A geometry processor 904 performs geometry processing such as a coordinate transformation, perspective transformation, light source calculation, and curved surface generation based on instructions from a program which operates on the main processor 900, and performs a matrix calculation at a high speed. A data decompression processor 906 performs decode processing of compressed image data or sound data, or accelerates the decode processing of the main processor 900. This enables a motion picture compressed according to the MPEG standard or the like to be displayed in an opening screen or a game screen.

A drawing processor 910 performs drawing (rendering) processing of an object formed by a primitive surface such as a polygon or a curved surface. When drawing an object, the main processor 900 delivers drawing data to the drawing processor 910 by utilizing a DMA controller 970, and transfers a texture to a texture storage section 924, if necessary. The drawing processor 910 draws the object in a frame buffer 922 based on the drawing data and the texture while performing hidden surface removal utilizing a Z-buffer or the like. The drawing processor 910 also performs α-blending (translucent processing), depth queuing, MIP mapping, fog processing, bilinear filtering, trilinear filtering, anti-aliasing, shading processing, or the like. When an image for one frame has been written into the frame buffer 922, the image is displayed on a display 912.

A sound processor 930 includes a multi-channel ADPCM sound source or the like, generates game sound such as background music, effect sound, or voice, and outputs the generated game sound through a speaker 932. Data from a game controller 942 or a memory card 944 is input through a serial interface 940.

A system program or the like is stored in the ROM 950. In the case of an arcade game system, the ROM 950 functions as an information storage medium, and various programs are stored in the ROM 950. A hard disk may be used instead of the ROM 950. A RAM 960 functions as a work area for various processors. The DMA controller 970 controls DMA transfer between the processor and the memory. A DVD drive 980 (may be CD drive) accesses a DVD 982 (may be CD) in which a program, image data, sound data, and the like are stored. The communication interface 990 performs data transfer with the outside through a network (communication line or high-speed serial bus).

The processing of each section (each means) according to the embodiment may be entirely realized by only hardware, or may be realized by a program stored in the information storage medium or a program distributed through the communication interface. The processing of each section according to the embodiment may be realized by hardware and a program.

In the case of realizing the processing of each section according to the embodiment by hardware and a program, a program for causing the hardware (computer) to function as each section according to the embodiment is stored in the information storage medium. In more detail, the program directs each of the processors 902, 904, 906, 910, and 930 (hardware) to perform the processing, and transfers data if necessary. Each of the processors 902, 904, 906, 910, and 930 realizes the processing of each section according to the embodiment based on the instructions and the transferred data.

The invention is not limited to the above-described embodiment, and various modifications and variations may be made. For example, the terms (e.g. Z-value, Z-coordinate, and Z-sort order) cited in the description in the specification or the drawings as the terms in a broad sense or in a similar sense (e.g. depth information and positioning order) may be replaced by the terms in a broad sense or in a similar sense in another description in the specification or the drawings.

The effect object position change method and the translucent blending processing method are not limited to those described in the above-described embodiment, and methods equivalent to these methods are also included within the scope of the invention.

The above-described embodiment illustrates the case where the first boundary surface is set in front of the virtual camera, the second boundary surface is set behind the virtual camera, and the position of the effect object positioned between the first boundary surface and the second boundary surface is changed. However, the invention is not limited thereto. The boundary surface may be set only behind the virtual camera, and the effect object positioned between the boundary surface and the screen may be positioned at least in front of the screen.

The invention may be applied to various games (e.g. fighting game, shooting game, robot fighting game, sport game, competitive game, role playing game, music playing game, and dance game). The invention may be applied to various image generation systems such as an arcade game system, consumer game system, large-scale attraction system in which a number of players participate, simulator, multimedia terminal, system board which generates a game image, and portable telephone.

Although only some embodiments of the invention have been described in detail above, those skilled in the art will readily appreciate that many modifications are possible in the embodiments without departing from the novel teachings and advantages of this invention. Accordingly, all such modifications are intended to be included within the scope of this invention.

What is claimed is:

1. A program product stored in a computer-readable information storage medium and executed by a computer for generating an image, the program product causing a computer to function as:

an event occurrence determination section which determines whether or not an effect event has occurred, an effect object being generated for the effect event;

a position determination section which determines whether or not a virtual camera or a player's character operated by a player exists within a given effect range, when the event occurrence determination section determines that the effect event has occurred, the given effect range being set based on an occurrence position of the effect event;

an effect position processing section, when the event occurrence determination section determines that the virtual camera or the player's character exists within the effect range and the effect object is outside an angle of view of the virtual camera, the effect position processing section positioning within the angle of view of the virtual camera at least the effect object or a dummy effect object provided in advance; and an image generation section which generates an image viewed from the virtual camera in an object space.

2. The program product as defined in claim 1, wherein, when a plurality of effect objects are generated based on the effect event, the effect position processing section moves and positions the effect objects within the angle of view of the virtual camera without changing at least a positioning order of the effect objects in a depth direction in a camera coordinate system.

3. The program product as defined in claim 2, wherein a space between a first boundary surface set in front of the virtual camera in the camera coordinate system and a second boundary surface set behind the virtual camera in the camera coordinate system is set as a given depth range; and wherein the effect position processing section calculates depth information on the effect objects in the camera coordinate system based on a ratio of a first distance between the first boundary surface and a screen to a second distance between the first boundary surface and the second boundary surface so that the effect objects are positioned between the first boundary surface and the screen, and moves and positions the effect objects within the angle of view of the virtual camera based on the depth information, the effect objects having been positioned within the given depth range.

4. The program product as defined in claim 1, wherein, when a plurality of effect objects are generated based on the effect event, the effect position processing section positions a plurality of dummy effect objects respectively corresponding to the effect objects within the angle of view of the virtual camera, according to at least a positioning order of the effect objects in a depth direction in a camera coordinate system.

5. The program product as defined in claim 4, wherein a space between a first boundary surface set in front of the virtual camera in the camera coordinate system and a second boundary surface set behind the virtual camera in the camera coordinate system is set as a given depth range; and wherein the effect position processing section calculates depth information on the effect objects in the camera coordinate system when the effect objects are positioned between the first boundary surface and a screen, based on a ratio of a first distance between the first boundary surface and the screen to a second distance between the first boundary surface and the second boundary surface, and positions the plurality of dummy effect objects respectively corresponding to the effect objects within the angle of view of the virtual camera based on the depth information, the effect objects having been positioned within the given depth range.

6. The program product as defined in claim 1, the program product causing the computer to function as:
a translucent processing section which performs translucent blending processing based on depth information in a camera coordinate system on the effect object or the dummy effect object positioned by the effect position processing section so that transparency of the effect object or the dummy effect object is increased as a position of the effect object or the dummy effect object comes closer to a position of a screen or the virtual camera.

7. The program product as defined in claim 1, wherein:
a screen is divided to display first to Nth images (N is an integer greater than one);
the image generation section generates images viewed from first to Nth virtual cameras as the first to Nth images;
the position determination section determines whether or not the first to Nth virtual cameras or first to Nth player's characters exist within the effect range set based on the occurrence position of the effect event; and
only when the position determination section determines that a Kth (1≦K≦N) virtual camera of the first to Nth virtual cameras or a Kth player's character of the first to Nth player's characters exists within the effect range and the effect object is outside the angle of view of the Kth virtual camera, the effect position processing section positions within the angle of view of the Kth virtual camera at least the effect object or the dummy effect object provided in advance.

8. A program product stored in a computer-readable information storage medium and executed by a computer for generating an image, the program product causing a computer to function as:
an event occurrence determination section which determines whether or not an effect event has occurred, an effect object being generated for the effect event;
a position determination section which determines whether or not a virtual camera or a player's character operated by a player exists within a given effect range, when the event occurrence determination section determines that the effect event has occurred, the given effect range being set based on an occurrence position of the effect event;
a virtual camera control section, when the event occurrence determination section determines that the virtual camera or the player's character exists within the effect range and the effect object is outside a angle of view of the virtual camera, the virtual camera control section changing a position of the virtual camera so that at least the effect object is within the angle of view of the virtual camera; and
an image generation section which generates an image viewed from the virtual camera in an object space.

9. An image generation system for generating an image, the image generation system comprising:
an event occurrence determination section which determines whether or not an effect event has occurred, an effect object being generated for the effect event;
a position determination section which determines whether or not a virtual camera or a player's character operated by a player exists within a given effect range, when the event occurrence determination section determines that the effect event has occurred, the given effect range being set based on an occurrence position of the effect event;
an effect position processing section, when the event occurrence determination section determines that the virtual camera or the player's character exists within the effect range and the effect object is outside a angle of view of the virtual camera, the effect position processing section positioning within the dangle of view of the virtual camera at least the effect object or a dummy effect object provided in advance; and
an image generation section which generates an image viewed from the virtual camera in an object space.

10. An image generation system for generating an image, the image generation system comprising:
an event occurrence determination section which determines whether or not an effect event has occurred, an effect object being generated for the effect event;
a position determination section which determines whether or not a virtual camera or a player's character operated by a player exists within a given effect range, when the event occurrence determination section determines that the effect event has occurred, the effect range being set based on an occurrence position of the effect event;
a virtual camera control section, when the event occurrence determination section determines that the virtual camera or the player's character exists within the effect range and the effect object is outside a angle of view of the virtual camera, the virtual camera control section changing a position of the virtual camera so that at least the effect object is within the angle of view of the virtual camera; and
an image generation section which generates an image viewed from the virtual camera in an object space.

11. An image generation method, comprising:
determining whether or not an effect event has occurred;
generating an effect object for the effect event;
determining whether or not a virtual camera or a player's character operated by a player exists within a given effect range, when the occurrence of the effect event is determined, the effect range being set based on an occurrence position of the effect event;
when the existence of the virtual camera or the player's character within the effect range is determined and the effect object is outside a angle of view of the virtual camera, positioning within the angle of view of the virtual camera at least the effect object or a dummy effect object provided in advance; and
generating an image viewed from the virtual camera in an object space.

12. An image generation method, comprising:
determining whether or not an effect event has occurred;
generating an effect object for the effect event;
determining whether or not a virtual camera or a player's character operated by a player exists within a given effect range, when the occurrence of the effect event is determined, the effect range being set based on an occurrence position of the effect event;
when the existence of the virtual camera or the player's character within the effect range is determined and the effect object is outside an angle of view of the virtual camera, changing a position of the virtual camera so that at least the effect object is within the angle of view of the virtual camera; and
generating an image viewed from the virtual camera in an object space.

13. The program product as defined in claim 1, wherein the effect object is positioned within the angle of view of the virtual camera by moving the effect object linearly along a z-axis of the virtual camera.

14. The program product as defined in claim 8, wherein the virtual camera control section changing a position of the virtual camera by moving the virtual camera linearly along a z-axis of the virtual camera so that at least the effect object is within the angle of view of the virtual camera.

15. The image generation system as defined in claim 9, wherein the effect object is positioned within the angle of view of the virtual camera by moving the effect object linearly along a z-axis of the virtual camera.

16. The image generation system product as defined in claim 10, wherein the virtual camera control section changing a position of the virtual camera by moving the virtual camera linearly along a z-axis of the virtual camera so that at least the effect object is within the angle of view of the virtual camera.

17. The image generation method as defined in claim 11, wherein the effect object is positioned within the angle of view of the virtual camera by moving the effect object linearly along a z-axis of the virtual camera.

18. The image generation method as defined in claim 12, wherein the virtual camera control section changing a position of the virtual camera by moving the virtual camera linearly along a z-axis of the virtual camera so that at least the effect object is within the angle of view of the virtual camera.

* * * * *